(12) United States Patent
Ohama et al.

(10) Patent No.: US 8,793,204 B2
(45) Date of Patent: Jul. 29, 2014

(54) CLASSIFICATION DEVICE AND CLASSIFICATION METHOD

(75) Inventors: Iku Ohama, Osaka (JP); Toshihisa Abe, Osaka (JP); Hiroki Arimura, Hokkaido (JP); Takuya Kida, Hokkaido (JP)

(73) Assignee: Panasonic Corporation, Osaka (JP)

( * ) Notice: Subject to any disclaimer, the term of this patent is extended or adjusted under 35 U.S.C. 154(b) by 151 days.

(21) Appl. No.: 13/498,396

(22) PCT Filed: Sep. 26, 2011

(86) PCT No.: PCT/JP2011/005376
§ 371 (c)(1),
(2), (4) Date: Mar. 27, 2012

(87) PCT Pub. No.: WO2012/042814
PCT Pub. Date: Apr. 5, 2012

(65) Prior Publication Data
US 2012/0209799 A1    Aug. 16, 2012

(30) Foreign Application Priority Data

Oct. 1, 2010  (JP) .................................. 2010-224275
Nov. 29, 2010 (JP) .................................. 2010-265781

(51) Int. Cl.
*G06F 15/18* (2006.01)
*G06N 5/02* (2006.01)
*G06K 9/62* (2006.01)
*G06K 9/00* (2006.01)

(52) U.S. Cl.
CPC ................ *G06N 5/025* (2013.01); *G06F 15/18* (2013.01); *G06K 9/6297* (2013.01); *G06K 9/00335* (2013.01)

USPC .............................................. 706/20; 706/45

(58) Field of Classification Search
USPC ...................................................... 706/20, 45
See application file for complete search history.

(56) References Cited

FOREIGN PATENT DOCUMENTS

| JP | 2004-362066 | 12/2004 |
| JP | 2007-226555 | 9/2007 |
| JP | 2007-249922 | 9/2007 |
| JP | 2008-27364 | 2/2008 |
| JP | 2009-25853 | 2/2009 |

OTHER PUBLICATIONS

Wu, et al., Tracking with Dynamic Hidden-State Shape Models, ECCV 2008, Part I, LNCS 5302, 2008, pp. 643-656.*

(Continued)

*Primary Examiner* — Wilbert L Starks
(74) *Attorney, Agent, or Firm* — Wenderoth, Lind & Ponack, L.L.P.

(57) ABSTRACT

Provided is a classification device capable of classifying time series data of location information into groups in which continuity of time is secured. The classification device (100) includes a data storage unit (110) that stores time-of-day information and location information corresponding to the time-of-day information, a sorting unit (120) that sorts the location information in order of time using the time-of-day information, a hidden Markov model storage unit (130) storing therein a left-to-right hidden Markov model containing a plurality of states and in which a parameter is undetermined, a Markov model output unit (140) that determines the parameter by inputting the location information sorted in order of time into the hidden Markov model, and a classification unit (150) that classifies each location information in one of the plurality of states by inputting the location information sorted in order of time into the hidden Markov model containing the determined parameter.

12 Claims, 13 Drawing Sheets

(56) References Cited

OTHER PUBLICATIONS

International Search Report issued Dec. 20, 2011 in corresponding International Application No. PCT/JP2011/005376.
Akinori Asahara et al., "Indoor and Outdoor Pedestrian Trajectory Analysis and the Experiment", IPSJ SIG Technical Reports, Dec. 15, 2009, (4) [CD-ROM], pp. 1-8, with English abstract.
Kenta Oku et al., "A Recommendation Method Considering User's Time Series Contexts", IPSJ SIG Technical Reports, Sep. 14, 2008, vol. 2008, No. 88, pp. 121-126, with English abstract.
Iku Ohama et al., "Event Clustering Method based on Linear HMM for Geotagged Personal Contents", IEICE Technical Report, Mar. 21, 2011, vol. 110, No. 476, pp. 9-16, with English abstract.

* cited by examiner

FIG. 3

| Content ID | Time-of-day information (Year/month/day/hour/minute/second) | Location information (Latitude/longitude/altitude) |
|---|---|---|
| P1 | 2009/03/23/12/09/33 | North latitude 34° 42' 56"/ East longitude 135° 29' 05"/ Altitude 30 meters |
| P2 | 2009/03/23/12/11/41 | North latitude 34° 42' 29"/ East longitude 135° 29' 31"/ Altitude 30 meters |
| P3 | 2009/03/23/12/14/17 | North latitude 34° 42' 26"/ East longitude 135° 29' 30"/ Altitude 30 meters |
| P4 | 2009/03/23/12/15/25 | North latitude 34° 42' 30"/ East longitude 135° 29' 28"/ Altitude 30 meters |
| P5 | 2009/03/23/13/16/05 | North latitude 34° 42' 27"/ East longitude 135° 29' 34"/ Altitude 30 meters |
| P6 | 2009/03/23/13/17/25 | North latitude 34° 42' 25"/ East longitude 135° 29' 32"/ Altitude 30 meters |
| P7 | 2009/03/23/13/18/20 | North latitude 34° 42' 39"/ East longitude 135° 30' 19"/ Altitude 30 meters |
| P8 | 2009/03/23/13/19/33 | North latitude 34° 42' 40"/ East longitude 135° 30' 22"/ Altitude 30 meters |
| P9 | 2009/03/23/13/20/21 | North latitude 34° 41' 59"/ East longitude 135° 30' 38"/ Altitude 30 meters |
| ... | ... | ... |

FIG. 14

| Probability distribution | Label |
|---|---|
| $\mu = 0$, $\sigma^2 = 1.0$ | "Staying" |
| $\mu = 0$, $\sigma^2 = 5.0$ | "Moving" |

CLASSIFICATION DEVICE AND CLASSIFICATION METHOD

TECHNICAL FIELD

The present invention relates to a device and a method for classifying a plurality of pieces of location information, and more particularly to a device and a method for classifying a plurality of pieces of location information each associated with time-of-day information.

BACKGROUND ART

Various methods have recently been developed that utilize the global positioning system (GPS), radio-frequency identification (RFID), an image sensor, a laser radar or the like, for acquiring location information of a subject. By recording the location information by such methods, the location where the subject was at a certain time in the past can be identified.

For example, studies are being made on the utilization of records of a plurality of pieces of location information (time series data of the location information) each associated with time-of-day information, as a life log of the subject. In some studies, specifically, a part of the location information constituting the life log, the part representing physically close locations, is selectively grouped so as to classify the life log by events that are significant to the user. Such classification facilitates searching of the past life log of the subject.

Now, the movement pattern of the subject seen in the life log widely varies depending on the purpose. When the purpose of the activity of the subject is "sight-seeing" or "strolling" for example, the time series data of the relevant location information concentrates in a relatively small range. However, when the purpose of the activity is "transfer" from one place to another, the time series data of the relevant location information is recorded as data showing a movement toward a specific direction.

To classify the time series data of the location information, simply grouping the location information representing physically close locations is not suitable. For example, the location information acquired during the "transfer" represents locations that are physically distant from each other, and therefore such information is not classified into a single group of "transfer", but into a plurality of groups (fragmented).

On the other hand, a statistical model can be utilized for classification into groups each representing activities of a similar pattern. For example, PTL 1 proposes processing the time series data of the location information on the basis of a hidden Markov model (HMM), thereby classifying the time series data into units of the location information that presents similar statistical dispersion.

CITATION LIST

Patent Literature

[PTL 1] Japanese Unexamined Patent Application Publication No. 2009-25853

SUMMARY OF INVENTION

Technical Problem

The foregoing techniques have, however, a drawback in that the time series data of the location information is unable to be classified into groups in which continuity in time associated with the location information is secured.

As an example, it will be assumed that the time series data of the location information recorded during a circular tour is to be classified. In the case where the location information recorded at different opportunities represents physically close locations, for example where the subject has moved along generally the same route both in the outbound and inbound ways, or has visited the same place a plurality of times as shown in FIG. 1, it is impossible to distinguish those different opportunities from each other.

Accordingly, as classified in FIG. 1, the location information recorded on the outbound way and that recorded on the inbound way are both grouped in "point B", "point C", and "point D". Thus, the classification result may be modeled in a pattern that barely makes sense to the user.

The present invention has been accomplished in view of the foregoing problem, and provides a classification device and a classification method that allows time series data of location information to be classified into groups in which continuity in time associated with the location information is secured.

Solution to Problem

Accordingly, the present invention provides a classification device including a data storage unit configured to store a plurality of pieces of time-of-day information each indicating a different time of day, and a plurality of pieces of location information respectively associated with one of the plurality of pieces of time-of-day information and indicating a location where a subject was at an associated time of day; a sorting unit configured to sort the plurality of pieces of location information in order of time by using the plurality of pieces of time-of-day information; a hidden Markov model storage unit storing therein a left-to-right hidden Markov model that contains a plurality of states and in which a parameter is undetermined; a Markov model output unit configured to determine the parameter by inputting the plurality of pieces of location information sorted in order of time by the sorting unit into the hidden Markov model, and output a defined hidden Markov model containing the determined parameter; and a classification unit configured to classify each of the plurality of pieces of location information into one of the plurality of states in order of time, by inputting the plurality of pieces of location information sorted in order of time by the sorting unit into the defined hidden Markov model.

The classification device thus configured can classify the time series data of the location information into groups in which continuity in time associated with the location information is secured. In other words, since the hidden Markov model is employed, the plurality of pieces of location information can be classified on the basis of the dispersion of the location information. The dispersion of the location information is often different depending on the type of events experienced by the subject, and therefore the possibility is improved that the plurality of pieces of location information can be accurately classified with respect to each event.

Further, since the left-to-right hidden Markov model in which the state transition is restricted is employed, the classification can be performed under the assurance that the continuity in time of the location information sorted in order of time is secured. More specifically, since the states in the left-to-right hidden Markov model are restricted from transiting again to the state once reached, inputting the location information sorted in order of time into the hidden Markov model results in the assurance that the continuity in time is secured.

The classification device may further include a content storage unit configured to store a plurality of contents respectively corresponding to one of the plurality of pieces of location information; and a content output unit configured to read out from the content storage unit, with respect to each of the plurality of states, the content corresponding to the location information classified into the corresponding state, and output the content.

The above configuration allows the content corresponding to the location information to be outputted in accordance with the classification result with respect to each state, thereby allowing the user to recognize the contents classified by events corresponding to the state.

Preferably, the hidden Markov model storage unit may store therein a plurality of left-to-right hidden Markov models each containing a different number of states and in each of which a parameter is undetermined. The Markov model output unit may be configured to determine the parameter of each of N (N is an integer not fewer than 2) hidden Markov models out of the plurality of hidden Markov models stored in the hidden Markov model storage unit, and output N defined hidden Markov models each containing the determined parameter, and the classification unit may be configured to classify each of the plurality of pieces of location information into one of the plurality of states contained in the corresponding defined hidden Markov model, with respect to each of the N defined hidden Markov models. The classification device may further include a decision unit configured to calculate a score indicating appropriateness of a classification result generated by the classification unit with respect to each of the defined hidden Markov models, and determine, as an optimum classification result, a classification result the calculated score of which satisfies a predetermined condition; and a classification result output unit configured to output the classification result determined by the decision unit.

In this case, the optimum classification result can be selected among the plurality of classification results, on the basis of the score indicating the appropriateness of the classification result, which leads to higher possibility that the user can obtain the desired classification result.

Preferably, the decision unit may be configured to determine, as the optimum classification result, the classification result that has gained the highest score among the N classification results.

In this case, the classification result that has gained the highest score is determined as the optimum classification result, which further improves the possibility that the user can obtain the desired classification result.

Preferably, the Markov model output unit may be configured to determine the parameter corresponding to a first hidden Markov model and a second hidden Markov model out of the plurality of hidden Markov models stored in the hidden Markov model storage unit, and output a first defined hidden Markov model and a second defined hidden Markov model each containing the determined parameter. The classification unit may be configured to classify each of the plurality of pieces of location information into one of the plurality of states contained in the first defined hidden Markov model to thereby generate a first classification result, and classify each of the plurality of pieces of location information into one of the plurality of states contained in the second defined hidden Markov model to thereby generate a second classification result, and the decision unit may be configured to calculate a first score indicating appropriateness of the first classification result and a second score indicating appropriateness of the second classification result, and determine the classification result corresponding to the higher one of the first score and the second score as the optimum classification result.

In this case, the classification result that has gained the higher score is determined as the optimum classification result, which further improves the possibility that the user can obtain the desired classification result.

Preferably, the first hidden Markov model may be a hidden Markov model containing a fewest number of states, and the second hidden Markov model may be a hidden Markov model containing a second fewest number of states. The decision unit may be configured to determine the first classification result as the optimum classification result in the case where the first score is equal to or higher than the second score, and cause the Markov model output unit to determine the parameter of a third hidden Markov model containing a third fewest number of states in the case where the first score is lower than the second score.

Sequentially processing the hidden Markov models as above from the one containing a fewer number of states results in reduced number of processing steps, which contributes to reduction of power consumption.

Preferably, the decision unit may be configured to cause the Markov model output unit to repeat the determination of the parameter until a score corresponding to a hidden Markov model containing an M-th fewest number of states (M is an integer not fewer than 2) becomes equal to or lower than a score corresponding to a hidden Markov model containing an (M−1)th fewest number of states.

In this case, the classification result that has gained the highest score is selected as the optimum classification result, which further improves the possibility that the user can obtain the desired classification result.

Preferably, the classification device may further include an instruction reception unit configured to receive an instruction of a user indicating the number of states of the hidden Markov model. The hidden Markov model storage unit may store therein a plurality of left-to-right hidden Markov models each containing a different number of states and in which a parameter is undetermined, and the Markov model output unit may be configured to determine the parameter of the hidden Markov model containing the number of states indicated by the instruction received by the instruction reception unit.

Such a configuration allows the user to designate the number of states. Since the number of states corresponds to the number of groups into which the location information is to be classified, and therefore the possibility that the user can obtain the desired classification result can be further improved.

Preferably, the parameter may contain a symbol occurrence probability indicating a corresponding probability distribution with respect to each state, the probability distribution is assigned with a predetermined label formed on the basis of a profile of the probability distribution, and the classification unit may further be configured to attach the label to each state and output the classification result with the label.

Such an arrangement allows the classification result to be outputted together with the label showing the feature of the state, thereby facilitating the user to recognize which type of group the classified location information belongs to.

The present invention may be realized not only as the foregoing classification device, but also as a method including the distinctive operations performed by the constituents of the classification device, or as a program that causes a computer to execute the distinctive operations. The present invention may also be realized as a computer-readable recording medium such as a CD-ROM having the program recorded thereon, or information, data, or signals representing the program. In addition, the program, the information, the data, and the signals may be distributed through a communication network such as the Internet.

Further, a part or whole of the constituents of the foregoing classification devices may be realized by a single system large-scale integration (LSI). The system LSI is a super-multifunction LSI manufactured by stacking a plurality of component units onto a single chip and, specifically, a computer system including a microprocessor, a ROM, a RAM and the like. The RAM stores a computer program Advantageous Effects of Invention The present invention allows time series data of location information to be classified into groups in which continuity in time associated with the location information is secured.

BRIEF DESCRIPTION OF DRAWINGS

FIG. 3 is a table showing examples of association between time-of-day information and location information according to the embodiment 1 of the present invention.

FIG. 14 is a table showing an example of association between probability distribution and a label according to the variation of the embodiments of the present invention.

DESCRIPTION OF EMBODIMENTS

Embodiment 1

Figure 1:
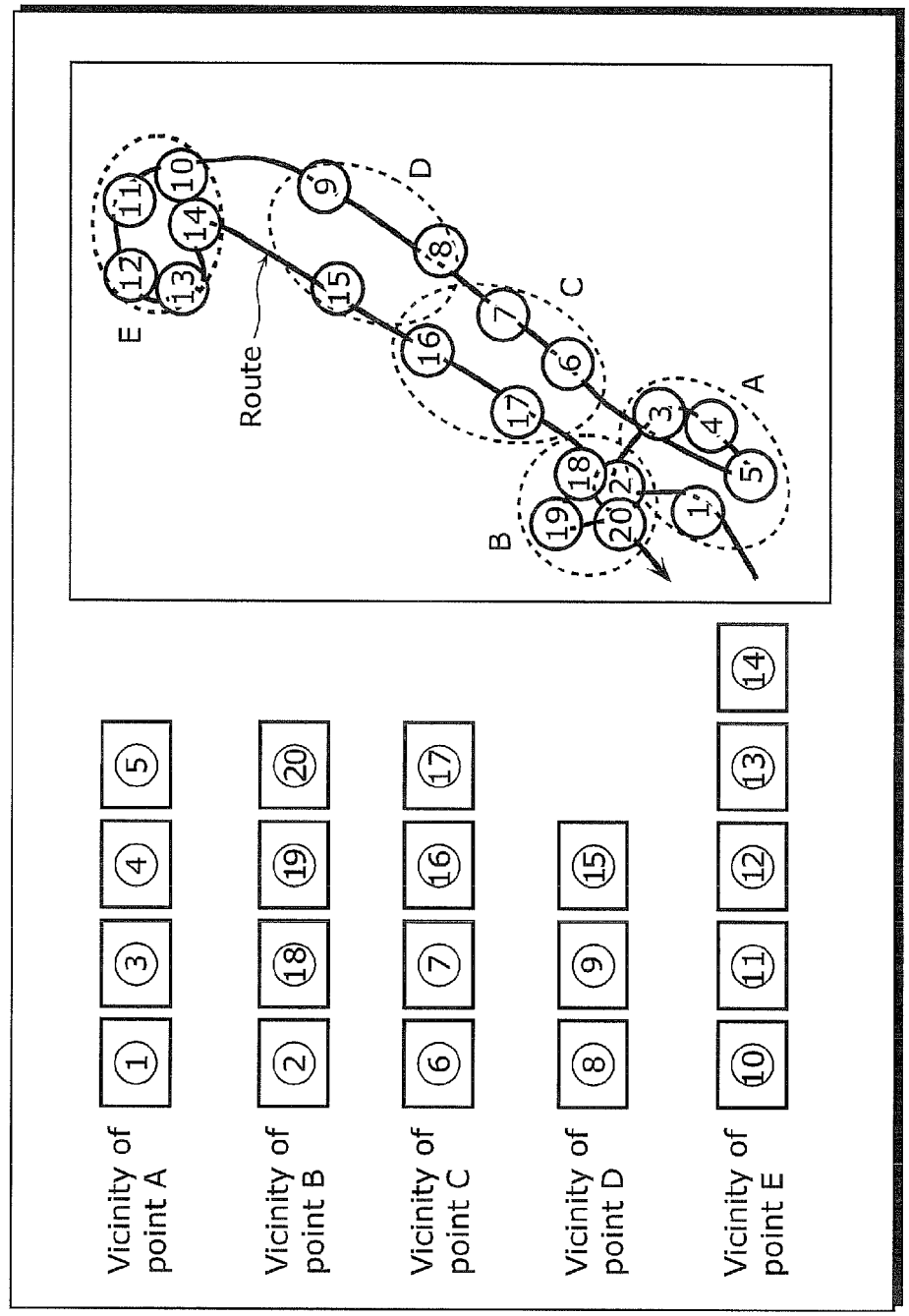
FIG. 1 is a schematic diagram showing a conventional classification result.

Hereafter, a classification device and a classification method according to embodiments of the present invention will be described referring to the drawings.

Embodiment 1

First, the outline of the classification device according to the embodiment 1 of the present invention will be described. The classification device according to the embodiment 1 sorts a plurality of pieces of location information in order of time and inputs the location information sorted in order of time into a left-to-right hidden Markov model, to thereby determine a parameter of the hidden Markov model. Then the classification device inputs the location information sorted in order of time into the hidden Markov model containing the determined parameter, to thereby classify the plurality of pieces of location information into one of a plurality of states.

With the classification device thus configured according to the embodiment 1, the location information can be classified into groups in which continuity in time associated with the location information is secured.

Here, the expression "continuity in time is secured" herein means that, when the location information associated with the earliest time among all the pieces of location information in a group is denoted as A and the location information associated with the latest time is denoted as B, the condition that "all such pieces of location information as associated with a time posterior to A and anterior to B belong to the same group as A and B" is established in all the groups upon grouping the time series data of the location information.

In addition, the expression "statistical dispersion of the location information is similar" herein means that, upon modeling the time series data of shooting positions with the hidden Markov model of a predetermined number of states, the probability that two different pieces of location information belong to the same state is relatively high.

Hereunder, a configuration of the classification device according to the embodiment 1 of the present invention will be described.

Figure 2:
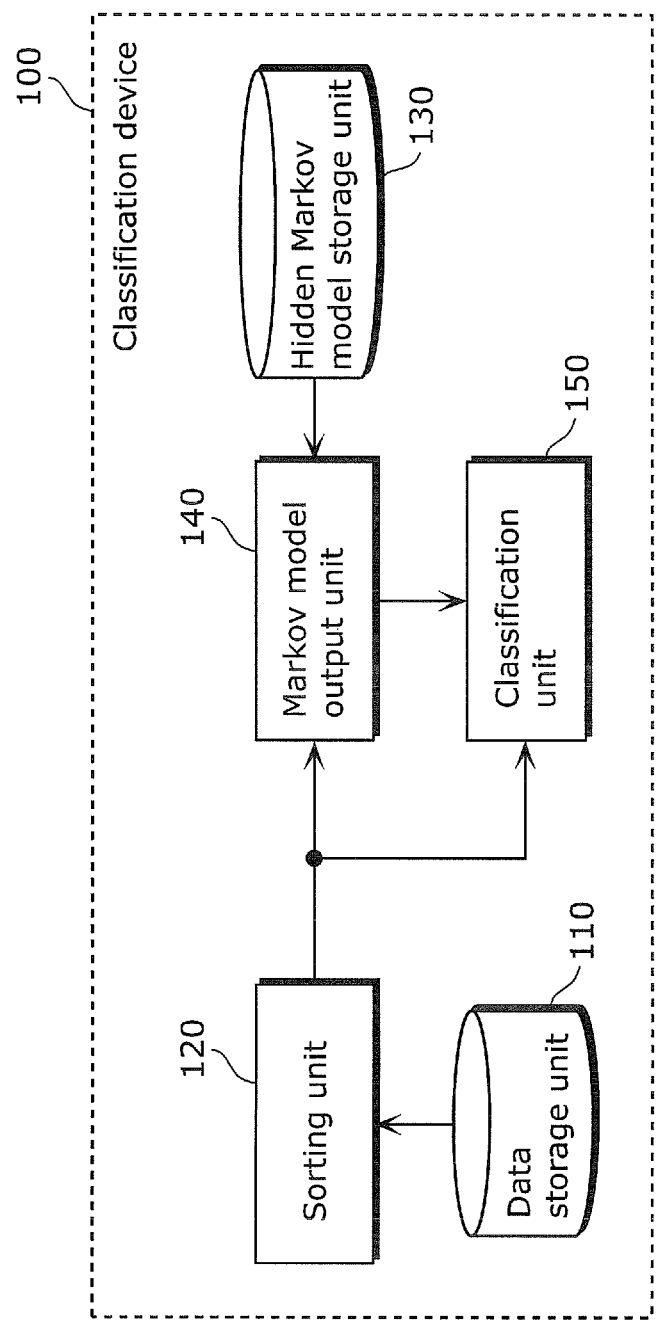
FIG. 2 is a block diagram showing a configuration of a classification device according to an embodiment 1 of the present invention.

FIG. 2 is a block diagram showing a configuration of the classification device 100 according to an embodiment 1 of the present invention. As shown therein, the classification device 100 includes a data storage unit 110, a sorting unit 120, a hidden Markov model storage unit 130, a Markov model output unit 140, and a classification unit 150.

The data storage unit 110 stores therein a plurality of pieces of time-of-day information each indicating a different time of day, and a plurality of pieces of location information respectively associated with one of the plurality of pieces of time-of-day information and indicating the location of a subject at the corresponding time of day. The data storage unit 110 may be removably mounted in the classification device 100. The data storage unit 110 may be, for example, a magnetic disk such as a hard disk drive (HDD), a memory card, or the like.

More specifically, the data storage unit 110 stores time series data of the location information. The time series data of the location information herein means the data representing the plurality of pieces of location information respectively associated with one of the plurality of pieces of time-of-day information. FIG. 3 is a table showing examples of the time series data of the location information according to the embodiment 1 of the present invention.

The time series data of the location information includes the plurality of pieces of time-of-day information and the plurality of pieces of location information. The time-of-day information each indicates a different time of day, for example represented by year/month/day/hour/minute/second as shown in FIG. 3. The location information each indicates the location of the subject associated with one of the time-of-day information, for example represented by latitude/longitude/altitude as shown in FIG. 3.

Regarding the examples shown in FIG. 3, the time series data of the location information represents a plurality of pieces of content information indicating the time and location at which each of the contents has been acquired. The contents may be, for example, still images and movie data taken by a camera. The content information includes the time-of-day information indicating the time at which the content was shot (year/month/day/hour/minute/second), the location information indicating the location where the content was shot (latitude/longitude/altitude), and a content ID for identifying the corresponding content.

It should be noted that the examples shown in FIG. 3 are not intended to limit the format of the time series data of the location information according to the present invention. For example, the time series data of the location information may only include the content ID, and the time-of-day information and the location information may be recorded on the header of the content, so as to be looked up when necessary. Examples of the specification that allows the location information to be recorded on the header of the content include an exchangeable image file (Exif) and, for example, a JPEG file or an MPEG file conforming to the Exif may be employed as the content information.

In addition, the time series data of the location information may or may not include the content ID, and it suffices that the time series data include the time-of-day information and the location information. For example, the time series data of the location information may be data indicating a transfer history of the subject, acquired by GPS or the like. The subject is a body that moves and stops with the lapse of time, and can be exemplified by various moving objects such as a person, a domestic animal, other types of animals, a carriage, and so forth.

Further, regarding the time series data of the location information according to the present invention, the time-of-day information may be such information that allows the location information recorded earlier or later to be identified in any given combination of different location information, instead of directly indicating the time of day as shown in FIG. 3.

The sorting unit 120 sorts the plurality of pieces of location information in order of time by using the plurality of pieces of time-of-day information. More specifically, the sorting unit 120 sorts the location information included in the time series data of the location information stored in the data storage unit 110, in order of the time indicated by the time-of-day information.

The hidden Markov, model storage unit 130 is a memory storing therein a left-to-right hidden Markov model containing a plurality of states and in which a parameter is unknown. The hidden Markov model storage unit 130 may be removably mounted in the classification device 100. The hidden Markov model is one of probability models, which contains a plurality of states, and defines stochastic state transition and stochastic symbol output on the basis of the parameter. The left-to-right hidden Markov model is an example of the hidden Markov model in which the state transition is restricted. More specifically, the left-to-right hidden Markov model is defined such that once a transition is made from a state A to a state B, a backward transition to the state A cannot be made thereafter.

The Markov model output unit 140 inputs the plurality of pieces of location information sorted in order of time by the sorting unit 120 into the hidden Markov model to thereby determine the parameter, and outputs a defined hidden Markov model based on the determined parameter. In other words, the Markov model output unit 140 determines the parameter that has been unknown, by using the time series data of the location information sorted in order of time by the sorting unit 120 and the left-to-right hidden Markov model containing a plurality of states and in which the parameter is unknown, stored in the hidden Markov model storage unit 130, and outputs the left-to-right hidden Markov model containing the determined parameter. The Markov model output unit 140 employs, for example, a Baum Welch algorithm to determine the parameter.

The classification unit 150 inputs the location information sorted in order of time by the sorting unit 120 into the defined hidden Markov model to thereby classify each of the location information into one of the plurality of states in order of time. In other words, the classification unit 150 generates classification information by using the time series data of the location information sorted in order of time by the sorting unit 120 and the left-to-right hidden Markov model containing the parameter determined by the hidden Markov model output unit 140. The classification unit 150 employs, for example, a Viterbi algorithm to classify the location information. Here, the classification information is the information indicating the classification result, more specifically the result obtained from classifying each of the plurality of pieces of location information into one of the plurality of states.

The Markov model output unit 140 and the classification unit 150 may perform a preliminary process including interpolating data among the plurality of pieces of location information sorted in order of time inputted thereinto, so that time differences between sequentially adjacent pieces of location information become constant. Alternatively, the classification device 100 may include a preliminary processing unit that performs the data interpolation.

In the case, for example, where acquisition of the location information has failed for some reason and hence the time series data containing a blank portion in the transfer history of the subject has been inputted, the section where acquisition of the location information has failed may affect the classification result. Accordingly, the Markov model output unit 140 and the classification unit 150 performs for example linear interpolation, so as to estimate the location of the subject at the time that the location information could not be acquired, and converts the time series data of the location information into data in which the time differences between the locations are constant. Thus, the Markov model output unit 140 and the classification unit 150 input the converted data into the hidden Markov model and the defined hidden Markov model, respectively.

Examples of the hidden Markov model, methods to determine the parameter, and specific examples of the classification method will be subsequently described.

As described above, the classification device 100 according to the embodiment 1 of the present invention classifies the location information by using the left-to-right hidden Markov model. Specifically, the classification device 100 sorts the location information in order of time, and inputs the location information sorted in order of time into the hidden Markov model in which the state transition is restricted, to thereby determine the parameter. Then the classification device 100 inputs the location information sorted in order of time into the hidden Markov model containing the determined parameter, to thereby classify each of the location information into one of the plurality of states.

Thus, since the state transition of the hidden Markov model is restricted, the plurality of pieces of location information sorted in order of time can be classified under the assurance that continuity in time can be secured.

An operation of the classification device 100 according to the embodiment 1 of the present invention will now be described hereunder.

Figure 4:
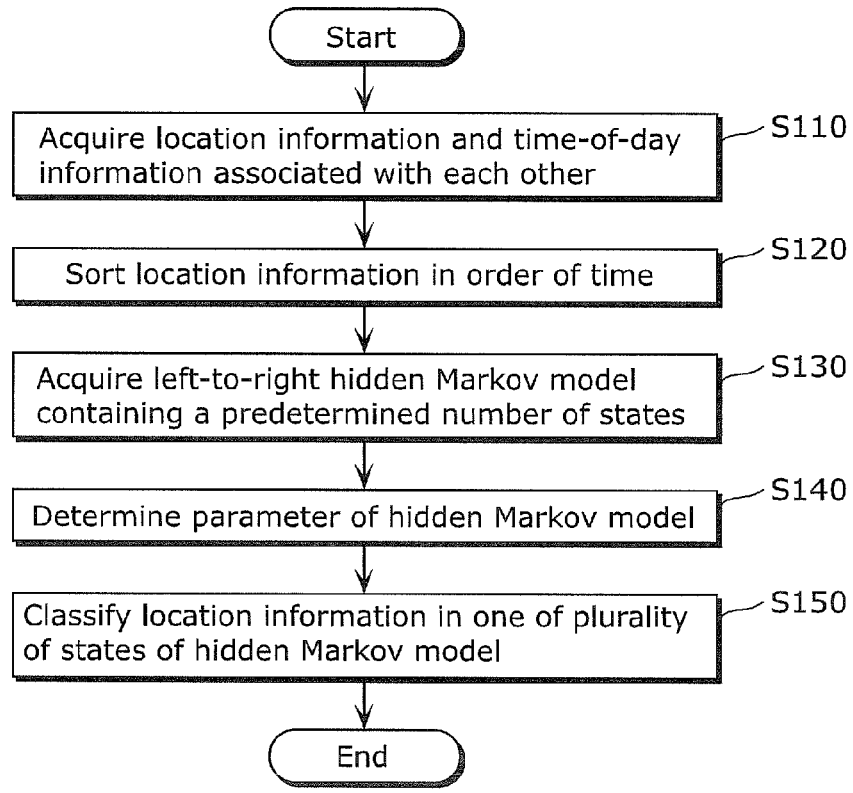
FIG. 4 is a flowchart showing an operation of the classification device according to the embodiment 1 of the present invention.

FIG. 4 is a flowchart showing an operation of the classification device 100 according to the embodiment 1 of the present invention.

First, the sorting unit 120 acquires the location information and the time-of-day information associated with each other, i.e., the time series data of the location information (S110). Here, the time series data of the location information is stored in the data storage unit 110. The sorting unit 120 then sorts the location information in order of time (S120).

The Markov model output unit 140 acquires the left-to-right hidden Markov model containing a predetermined number (2 or more) of states and in which a parameter is unknown, stored in the hidden Markov model storage unit 130 (S130). More specifically, the Markov model output unit 140 acquires an initialized parameter of the hidden Markov model, i.e., the initial value of the parameter of the hidden Markov model.

Here, the parameter of the hidden Markov model serves to define the model of the hidden Markov model, and contains a state transition probability matrix A and a statistical parameter θ of the probability distribution applicable to each state. In addition, the parameter may contain symbol occurrence probability indicating the corresponding probability distribution, with respect to each state.

The state transition probability matrix A is composed of K rows by K columns, where K represents the number of states, and is initialized such that the state transition is limited to either remaining in the same state or transition to a state that has not been reached. Equation 1 represents an example of the initialized state transition probability matrix A.

[Math. 1]

$$A = \begin{pmatrix} a_{11} & a_{12} & \cdots & a_{1,(K-1)} & a_{1,K} \\ a_{21} & a_{22} & \cdots & a_{2,(K-1)} & a_{1,K} \\ \vdots & \vdots & \ddots & \vdots & \vdots \\ a_{(K-1),1} & a_{(K-1),2} & \cdots & a_{(K-1),(K-1)} & a_{(K-1)K} \\ a_{K,1} & a_{K,2} & \cdots & a_{K,(K-1)} & a_{K,K} \end{pmatrix}$$
$$= \begin{pmatrix} a_{11} & 1-a_{11} & 0 & \cdots & 0 & 0 \\ 0 & a_{22} & 1-a_{22} & \cdots & 0 & 0 \\ 0 & 0 & a_{33} & \cdots & 0 & 0 \\ \vdots & \vdots & \vdots & \ddots & \vdots & \vdots \\ 0 & 0 & 0 & \cdots & a_{(K-1),(K-1)} & 1-a_{(K-1),(K-1)} \\ 0 & 0 & 0 & \cdots & 0 & 1 \end{pmatrix}$$ (Equation 1)

For example, the element $a_{i,j}$ at the i row of j column of the state transition probability matrix represents the probability that the state transits to the state j. In Equation 1, the element $a_{n,n}$ satisfies $0 < a_{n,n} < 1$, and $n = 1, 2, 3, \ldots, K-1$, and hence $a_{n,n} = 0.5$ ($n = 1, 2, 3, \ldots, K-1$) may be established. In other words, the probability ($a_{n,n}$) that the state remains the same and the probability ($1-a_{n,n}$) that the state transits to a next state may both be equally set as 0.5, as the initial value of the state transition probability matrix A.

The state transition probability matrix expressed as Equation 1 is merely exemplary and the present invention is not limited thereto. Although Equation 1 represents the case where the state i may transit to either the state i or the state i+1, the state i may be set so as to transit to a different state such as a state i+2. In this case, however, the initial value is determined such that a backward transition cannot be made afterwards to a state once reached. In addition, the initial value of $a_{n,n}$ is not limited to 0.5, but may be different from each other such as 0.3 for $a_{11}$ and 0.6 for $a_{22}$.

Further, the initial value of the state transition probability matrix may be set such that a first state (for example, state 1) may transit to the remaining K−1 pieces of states, and that a next state (for example, state 2) may transit to K−2 pieces of states except for the state 1.

The statistical parameter θ of the probability distribution applicable to each state may be expressed as K pieces of vectors $\theta_1, \theta_2, \theta_3, \ldots, \theta_K$ in L-th dimension, where K represents the number of states and L represents the degree of freedom of the probability distribution applicable to each state, and the respective vectors are initialized so as to indicate the initial value of the statistical parameter of the probability distribution applicable to the corresponding state. Here, although the embodiment of the present invention refers to the case where the probability distribution applicable to each state is a bivariate normal distribution, different types of probability distribution may naturally be employed, such as an autoregression model.

Equation 2 represents an example of the statistical parameter of the probability distribution applicable to each state, according to the embodiment 1 of the present invention.

[Math. 2]

$$\theta_k = \begin{pmatrix} \mu_k \\ \Sigma_k \end{pmatrix}$$ (Equation 2)

In Equation 2, $\mu_k$ represents the expectation of the probability distribution applicable to the state k, and $\Sigma_k$ represents a variance-covariance matrix of the probability distribution applicable to the state k.

Among various methods of selecting the initial value of the statistical parameter θ of the probability distribution, for example the expectation and variance-covariance matrix of K pieces of clusters acquired through a clustering method such as hierarchical clustering or K-means may be adopted as the initial value. More specifically, the expectation and variance-covariance matrix of the states acquired by classifying the actual data to be classified, i.e., the plurality of pieces of location information stored in the data storage unit 110, by a predetermined clustering method may be adopted as the initial value. Alternatively, the initial value of the statistical parameter θ of the probability distribution may be a predetermined fixed value.

Figure 5:
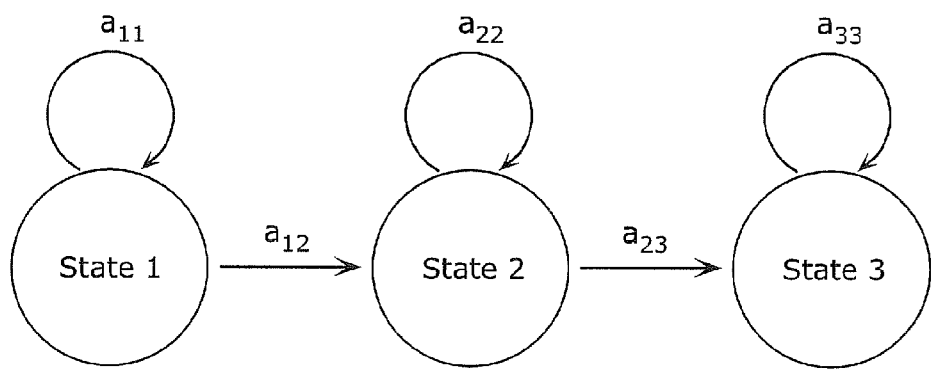
FIG. 5 is a schematic diagram showing an example of a left-to-right hidden Markov model according to the embodiment 1 of the present invention.

FIG. 5 is a schematic diagram showing an example of the left-to-right hidden Markov model. FIG. 5 illustrates the hidden Markov model in which the number of states is three. The number of states corresponds to the number of groups into which the location information is to be classified.

As shown in FIG. 5, for example, once the transition is made from the state 1 to the state 2, a backward transition to the state 1 will not be made thereafter. Thus, the left-to-right hidden Markov model only permits either remaining in the same state or a transition to a state that has not been reached in the past.

Then the Markov model output unit 140 identifies the parameter of the hidden Markov model (S140). More specifically, the Markov model output unit 140 identifies the parameter of the hidden Markov model by receiving the inputs of the initialized parameter of the hidden Markov model and the sorted time series data of the location information. The Markov model output unit 140 employs, for example, an algorithm known as Baum-Welch algorithm, which is an example of an expectation maximization (EM) algorithm, to determine the parameter of the hidden Markov model.

An example of the procedure to determine the parameter according to the embodiment 1 of the present invention will now be described hereunder. For the purpose of explaining the algorithm, the data to be inputted into the hidden Markov model, i.e., the sorted location information will be defined as the following Equation 3.

[Math. 3]

$$x = (x_1, x_2, \ldots, x_i, \ldots, x_L) \quad \text{(Equation 3)}$$

The element $x_i$ represents a first location information contained in the sorted time series data of the location information. Specifically, $x_i$ is a two-dimensional vector indicating a first latitude and longitude.

First, the Markov model output unit 140 calculates a sum $f_k(i)$ of probability that a state $n_i$ of the i-th data becomes k, out of the joint probability of all the states that a partial series $x_1$ to $x_i$ up to the i-th data of the time series data of the location information may assume (see Equation 4). This procedure is known as a forward algorithm.

[Math. 4]

$$f_k(i) = P(x_1, \ldots, x_i, \pi_i = k) \quad \text{(Equation 4)}$$

Then the Markov model output unit 140 calculates probability $b_k(i)$ that a partial series $x_{i+1}$ to $x_L$ from the (i+1)th up to the L-th data is outputted when the i-th location information of the time series data of the location information is in the state k (see Equation 5). This procedure is known as a backward algorithm.

[Math. 5]

$$b_k(i) = P(x_{i+1}, \ldots, x_L, \pi_i = k) \quad \text{(Equation 5)}$$

The Markov model output unit 140 calculates probability. $E_k(i)$ that the state $n_i$ of the i-th data is k in the time series data of the location information, by the following Equation 6 utilizing $f_k(i)$ and $b_k(i)$.

[Math. 6]

$$E_k(i) = P(\pi_i = k \mid x) = \frac{f_k(i) b_k(i)}{P(x)} \quad \text{(Equation 6)}$$

In Equation 6, $P(x)$ represents the probability that x defined as Equation 3 is outputted as the time series data of the location information (symbol occurrence probability), which may be calculated as the following Equation 7.

[Math. 7]

$$P(x) = \sum_k f_k(L) a_{k,0} = \sum_l a_{0,l} e_l(x_i) b_l(1) \quad \text{(Equation 7)}$$

However, $e_l(x_i)$ in Equation 7 represents the probability that the probability distribution of the state l outputs the data $x_i$, which is calculated as the following Equation 8 in the embodiment 1 of the present invention.

[Math. 8]

$$e_k(x_i \mid \mu_k, \Sigma_k) = \frac{1}{2\pi |\Sigma_k|^{1/2}} \exp\left\{-\frac{1}{2}(x_i - \mu_k)^T \Sigma_k^{-1}(x_i - \mu_k)\right\} \quad \text{(Equation 8)}$$

Here, Equation 8 is intended for use in the case where the probability distribution applicable to each state of the hidden Markov model is a bivariate normal distribution, and may naturally be modified in accordance with the probability distribution to be employed.

In addition, with reference to $a_{k,0}$ and $a_{0,l}$ in Equation 7, "0" represents a special state indicating a beginning and an end. In other words, $a_{k,0}$ represents the probability that the state k transits to the special state, and $a_{0,l}$ represents the probability that the special state transits to the state l.

Since the left-to-right hidden Markov model is employed in the embodiment 1 of the present invention, it is determined that the first stage is "1" and the final state is "K". Accordingly, in the case of k=K, $a_{k,0}$ equals to 1 and in the case of k≠K, $a_{k,0}$ equals to 0. Likewise, in the case of l=1, $a_{0,l}$ equals to 1, and in the case of l≠1, $a_{0,l}$ equals to 0.

Then the Markov model output unit 140 updates the parameter of the hidden Markov model. More specifically, the Markov model output unit 140 updates the statistical parameter θ of the probability distribution applicable to the state transition probability matrix A and each state, by the following Equation 9 utilizing $f_k(i)$, $b_k(i)$, and $P(x)$ thus far obtained.

[Math. 9]

$$a'_{k,l} = \frac{A_{k,l}}{\sum_{l'} A_{k,l'}},$$

$$\mu'_k = \frac{\sum_i x_i E_k(i)}{\sum_i E_k(i)},$$

$$\Sigma'_k = \frac{\sum_i E_k(i)(x_i - \mu_i)(x_i - \mu_i)^T}{\sum_i E_k(i)} \quad \text{(Equation 9)}$$

In Equation 9, $A_{k,l}$ may be calculated by the following Equation 10.

[Math. 10]

$$A_{k,l} = \frac{\sum_i f_k(i) a_{k,l} e_l(x_{i+1} \mid \mu_l, \Sigma_l) b_l(i+1)}{P(x)} \quad \text{(Equation 10)}$$

The terms $a_{k,l}'$, $\mu_k'$, and $\Sigma_k'$ in Equation 9 represent the updated state transition probability, expectation, and variance-covariance matrix, respectively. In addition, Equation 9 shows that the denominator of $a_{k,l}'$ is the total sum of the probability that the state reached by the transition may assume. The Markov model output unit 140 repeats such updating of the parameter until the value of each parameter is converged to a predetermined value. In this process, the updating may be repeated until the likelihood of the parameter is converged to a predetermined value, instead of the value of the parameter itself. Then the Markov model output unit 140 outputs the hidden Markov model in which the converged value is assigned to each parameter, as the defined hidden Markov model to the classification unit 150.

Further, the Markov model output unit 140 may determine the parameter either before, or after the updating as the converged value, in the case where a difference between the parameters before and after the updating is within a predetermined range. Alternatively, the Markov model output unit 140 may repeat the updating process a predetermined number of times. In this case, the Markov model output unit 140 outputs the hidden Markov model defined by the parameter acquired by the last updating.

Referring back to FIG. 4, finally the classification unit 150 classifies the location information into one of the plurality of states contained by the hidden Markov model (S150). More specifically, the classification unit 150 inputs the plurality of pieces of location information sorted in order of time into the hidden Markov model in order of time, to thereby classify the plurality of pieces of location information into one of the plurality of states. For example, the classification unit 150 classifies the location information into one of the plurality of states by using the Viterbi algorithm.

As described above, the classification device 100 according to the embodiment 1 of the present invention employs the left-to-right hidden Markov model to classify the location information. More specifically, the classification device 100 sorts the plurality of pieces of location information in order of time and inputs the plurality of pieces of location information sorted in order of time into the left-to-right hidden Markov model in which the state transition is restricted, to thereby determine the parameter. Then the classification device 100 inputs the location information sorted in order of time into the hidden Markov model containing the determined parameter, to thereby classify the location information into one of a plurality of states.

Thus, because of employing the hidden Markov model, the classification device 100 according to the embodiment 1 can classify the location information on the basis of the dispersion of the location information. Since the dispersion of the location information is often different depending on the type of events (sight-seeing, traveling, and so forth) experienced by the subject, the possibility that the location information can be accurately classified with respect to each event is improved.

Further, since the state transition of the hidden Markov model is restricted, the classification can be performed under the assurance that the continuity in time of the location information sorted in order of time is secured. Specifically, since the states in the left-to-right hidden Markov model are restricted from transiting again to the state once reached, inputting the location information sorted in order of time into the hidden Markov model results in the assurance that the continuity in time is secured.

As described above, the classification device 100 according to the embodiment 1 classifies the plurality of pieces of location information sorted in order of time on the basis of the left-to-right hidden Markov model. Therefore, the location information can be classified in the sequence in which the subject has experienced the states, with respect to each of the events in which the subject has participated.

Although the embodiment 1 of the present invention refers to the case where the plurality of pieces of location information is classified, the contents corresponding to the plurality of pieces of location information may be classified, on the basis of the classification result of the plurality of pieces of location information.

Figure 6:
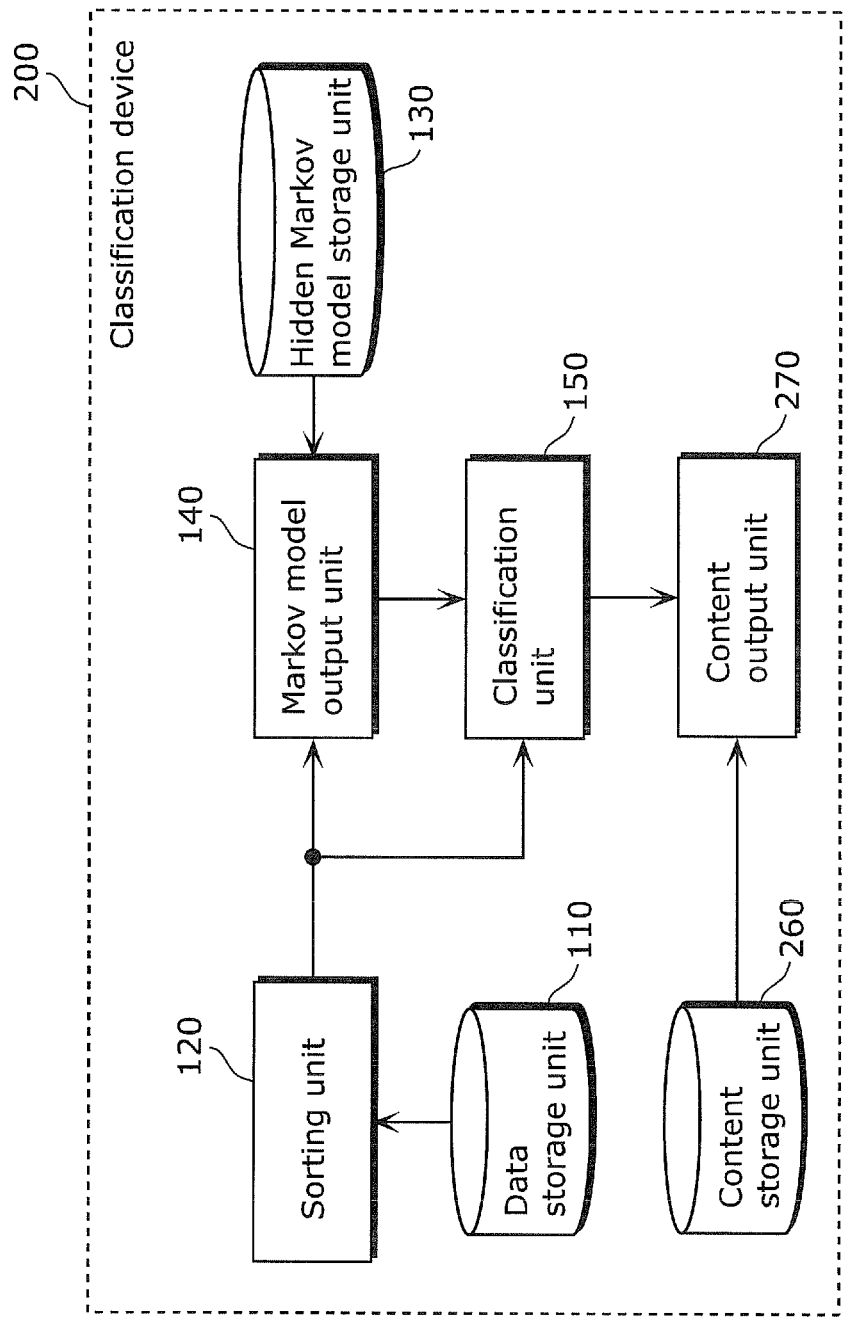
FIG. 6 is a block diagram showing a configuration of a classification device according to a variation of the embodiment 1 of the present invention.

FIG. 6 is a block diagram showing a configuration of a classification device according to a variation of the embodiment 1 of the present invention. The classification device 200 shown in FIG. 6 further includes a content storage unit 260 and a content output unit 270, in addition to the configuration of the classification device 100 shown in FIG. 2.

The content storage unit 260 stores therein a plurality of contents respectively corresponding to one of the plurality of pieces of location information. The content storage unit 260 may be removably mounted in the classification device 200. The content storage unit 260 may be constituted of a magnetic disk such as HDD, a memory card, or the like.

The content output unit 270 reads out, with respect to each state, the content corresponding to the location information classified into the corresponding state from the content storage unit 260, and outputs the content. The content output unit 270 may include a display unit for example, so as to display the classification result of the location information and the content associated therewith. Alternatively, the content output unit 270 may output the classification result and the associated content to an external display unit.

Figure 7:
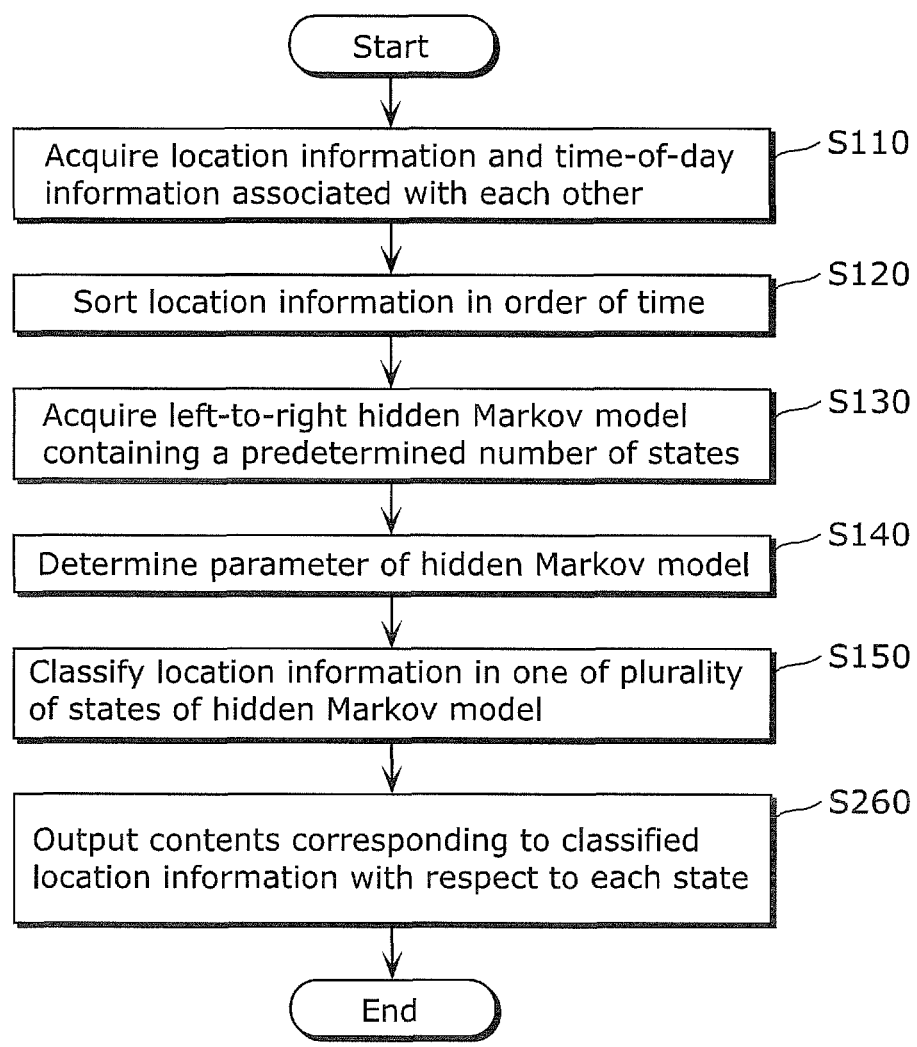
FIG. 7 is a flowchart showing an operation of the classification device according to the variation of the embodiment 1 of the present invention.

FIG. 7 is a flowchart showing an operation of the classification device 200 according to the variation of the embodiment 1 of the present invention. Here, the operation up to the step where the classification unit 150 classifies the location information on the basis of the defined hidden Markov model (S150) is the same as the operation shown in FIG. 4.

Figure 8:
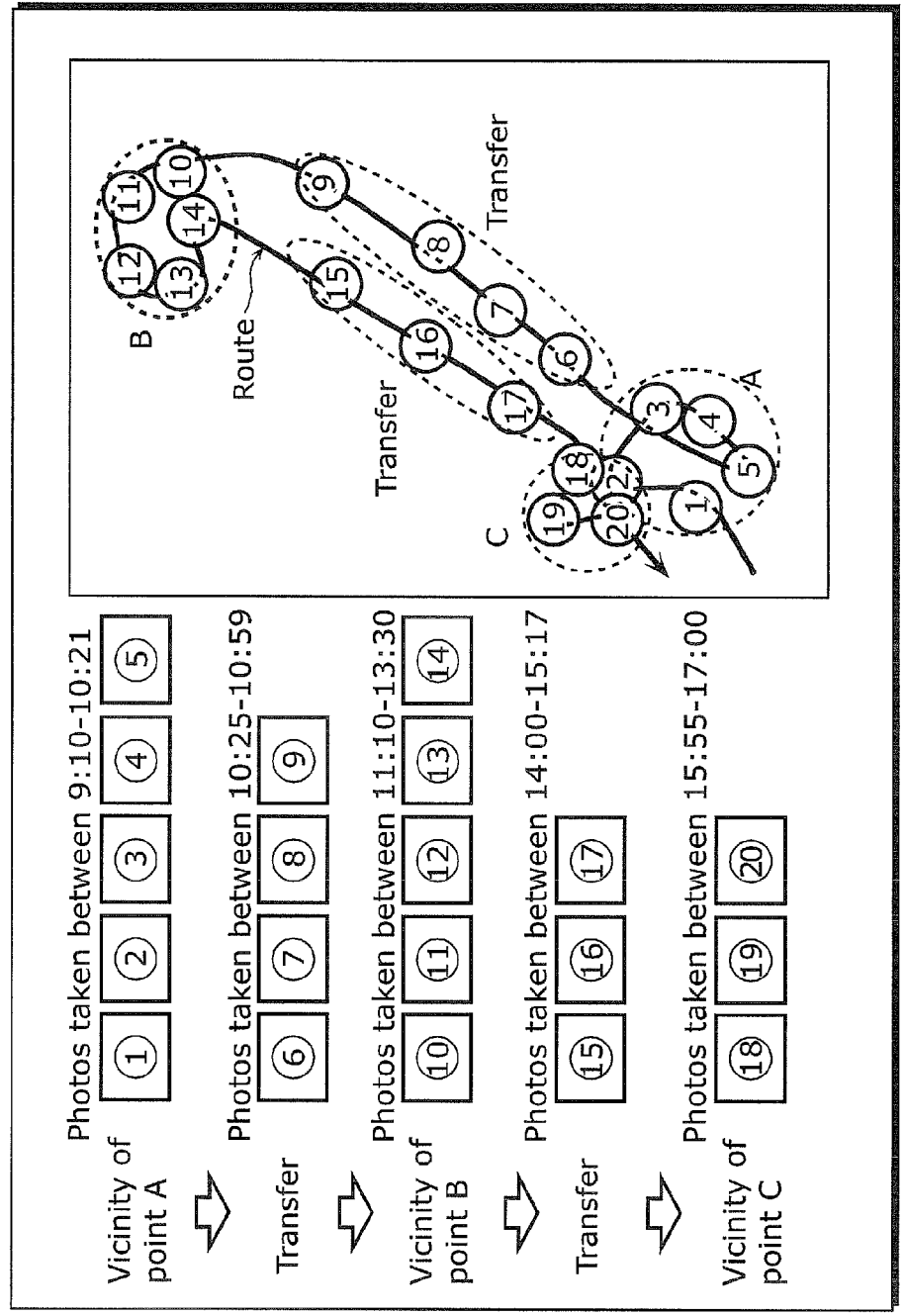
FIG. 8 is a schematic diagram showing a classification result according to the variation of the embodiment 1 of the present invention.

The content output unit 270 outputs, with respect to each state, the content corresponding to the classified location information on the basis of the classification result (S260). As shown in FIG. 8 for example, photos exemplifying the content are displayed in five classified states, which are "vicinity of a point A", "transfer (outbound)", "vicinity of a point B", "transfer (inbound)", and "vicinity of a point C". As is apparent from comparison with FIG. 1, the continuity in time of the content is secured and therefore the contents of the outbound way and those of the inbound way are prevented from being classified into the same state.

Thus, the classification device 200 according to the variation of the embodiment 1 displays the states grouped into units having a similar statistical dispersion of the location information with the continuity in photo-shooting time secured. Such an arrangement allows the user to view the contents, for example those shot during a circular tour, grouped by significant events.

Since the continuity in photo-shooting time of the grouped contents is secured, the contents in each group are composed of photos taken at close timings. Accordingly, although the contents have similar statistical dispersion of the location information, the contents shot at largely different timings are classified into different groups. Consequently, the user can view the contents more easily and smoothly reminding the incidents in the past.

Embodiment 2

A classification device according to an embodiment 2 of the present invention is configured so as to classify a plurality of pieces of location information with respect to each of a plurality of left-to-right hidden Markov models each containing a different number of states, to thereby determine an optimum classification result.

Accordingly the optimum classification result can be selected out of a plurality of classification results, which further assures that the user can obtain the desired classification result:

First, an example of the configuration of the classification device according to the embodiment 2 will be described.

Figure 9:
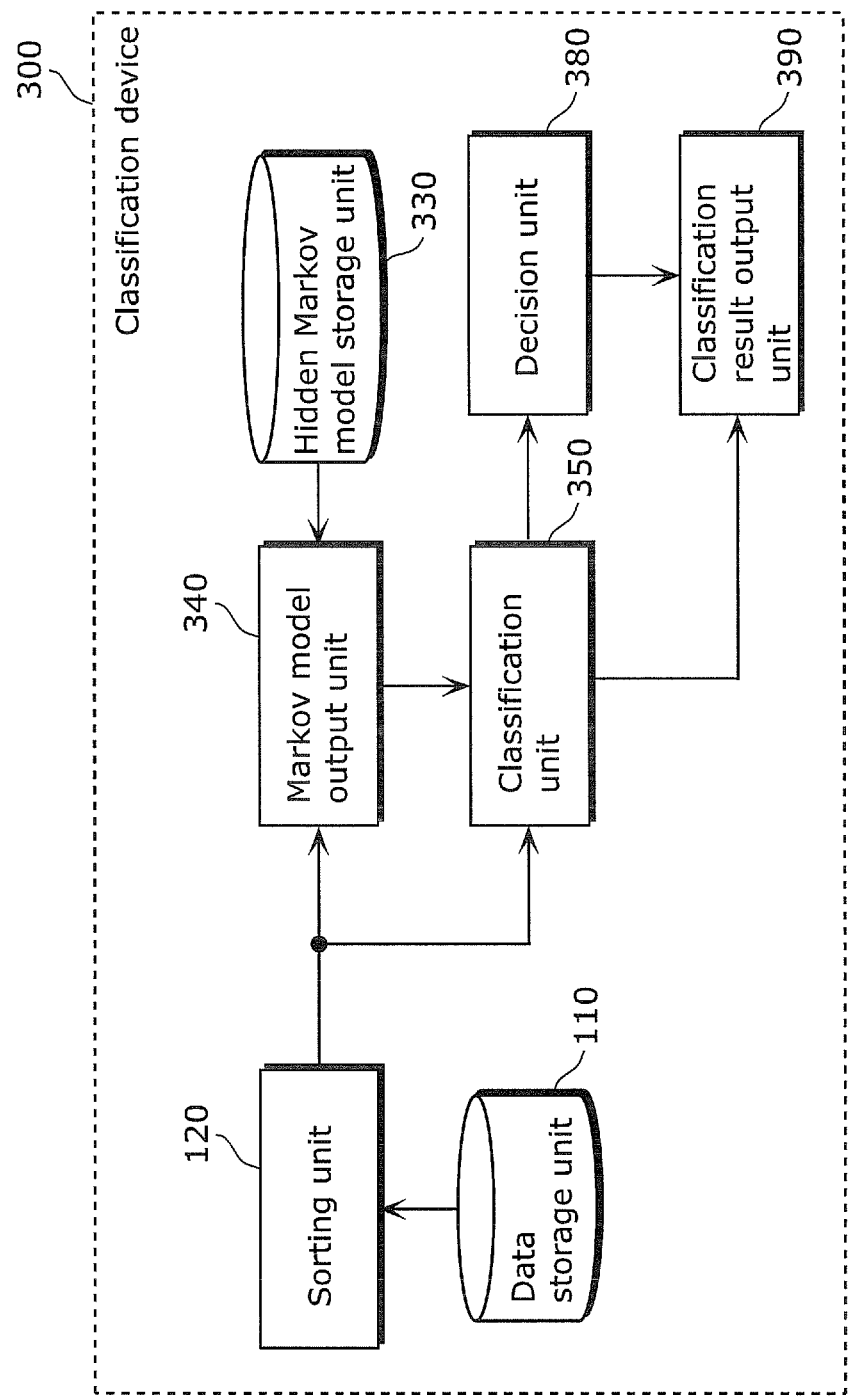
FIG. 9 is a block diagram showing a configuration of a classification device according to an embodiment 2 of the present invention.

FIG. 9 is a block diagram showing a configuration of the classification device 300 according to the embodiment 2 of the present invention. The classification device 300 shown in FIG. 9 is different from the classification device 100 shown in FIG. 2 in including a hidden Markov model storage unit 330, a Markov model output unit 340, and a classification unit 350 in place of the hidden Markov model storage unit 130, the Markov model output unit 140, and the classification unit 150, respectively, and in further including a decision unit 380 and a classification result output unit 390. The following description primarily refers to the difference from the classification device 100 according to the embodiment 1, and the description of the same, aspects will not be repeated.

The hidden Markov model storage unit 330 is a memory storing therein the plurality of left-to-right hidden Markov models in each of which a parameter is undetermined. The plurality of hidden Markov models each contains a different number of states. In other words, the number of states of the plurality of hidden Markov models is different from each other. The hidden Markov model storage unit 330 may be removably mounted in the classification device 300.

The Markov model output unit 340 determines the parameter of each of N pieces (N is an integer not fewer than 2) of hidden Markov models, out of the plurality of hidden Markov models stored in the hidden Markov model storage unit 330. Then the Markov model output unit 340 outputs N pieces of defined hidden Markov models in each of which the parameter has been determined. For example, the Markov model output unit 340 may determine the parameter of all the hidden Markov models stored in the hidden Markov model storage unit 330.

The classification unit 350 classifies, with respect to each of the N pieces of defined hidden Markov models, each of the location information into one of the plurality of states contained in the corresponding defined hidden Markov model. Accordingly, the classification unit 350 generates a classification result with respect to one of the hidden Markov models, in other words totally N pieces of classification results.

The decision unit 380 calculates a score indicating the appropriateness of the classification result generated by the classification unit 350 with respect to each of the defined hidden Markov models, and determines the classification result the score of which satisfies a predetermined condition as the optimum classification result. The decision unit 380 may, for example, determine the classification result that has gained the highest score among the N pieces of classification results as the optimum classification result. A specific example of the score will be subsequently described.

The classification result output unit 390 outputs the classification result determined by the decision unit 380.

As described above, the classification device 300 according to the embodiment 2 classifies the plurality of pieces of location information with respect to each of the plurality of left-to-right hidden Markov models each having a different number of states, and determines the optimum classification result. Accordingly, since the optimum classification result is selected out of the plurality of classification results, which further assures that the user can obtain the desired classification result.

An operation of the classification device 300 according to the embodiment 2 will be described hereunder.

Figure 10:
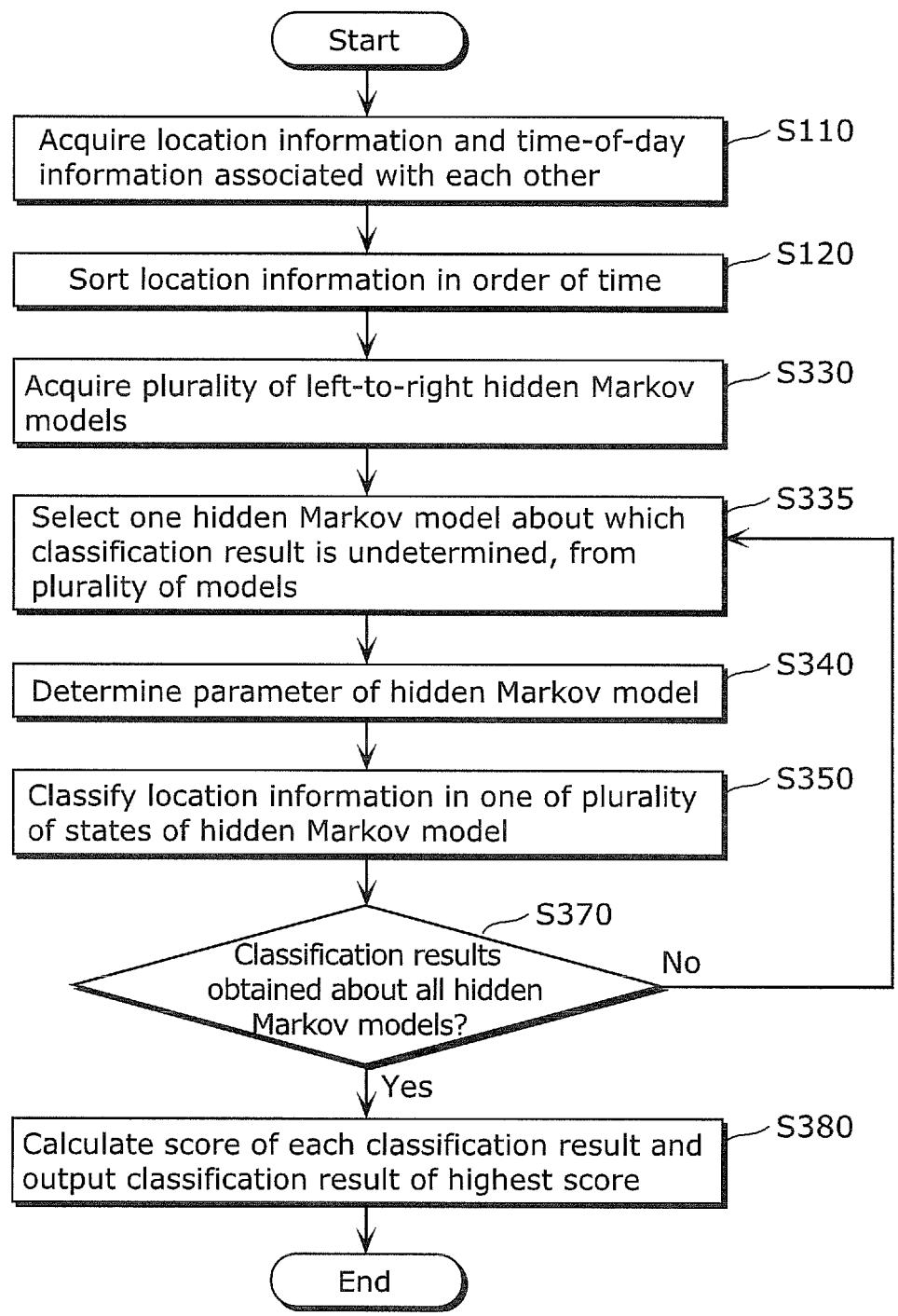
FIG. 10 is a flowchart showing an operation of the classification device according to the embodiment 2 of the present invention.

FIG. 10 is a flowchart showing an operation of the classification device 300 according to the embodiment 2 of the present invention.

First, the sorting unit 120 acquires the location information and the time-of-day information associated with each other, from the data storage unit 110 (S110). The sorting unit 120 then sorts the location information in order of time (S120).

Then the Markov model output unit 340 acquires the plurality of left-to-right hidden Markov models stored in the hidden Markov model storage unit 330 (S330). More specifically, the Markov model output unit 340 acquires N pieces (for example, all) of hidden Markov models.

The plurality of left-to-right hidden Markov models is the same as that described with reference to the embodiment 1. Since the plurality of hidden Markov models each contains a different number of states, the initial values of the parameters are also different.

The Markov model output unit 340 then selects one hidden Markov model about which the classification result is not determined yet, out of the plurality of hidden Markov models (S335), and determines the parameter of the selected hidden Markov model (S340). The specific method of determining the parameter is the same as that described referring to the embodiment 1, and hence the description will not be repeated.

The classification unit 350 classifies the location information into one of the plurality of states contained in the defined hidden Markov model containing the determined parameter (S350). At this stage, the classification result corresponding to the hidden Markov model selected by the Markov model output unit 340 can be obtained.

The decision unit 380 decides whether the classification result has been obtained with respect to all the hidden Markov models acquired by the Markov model output unit 340 (S370). In the case where the classification results have not been obtained from all the hidden Markov models (No at S370), the decision unit 380 causes the Markov model output unit 340 to select a next hidden Markov model and to calculate the parameter of the selected hidden Markov model (return to S335).

In the case where the classification result has been obtained from all the hidden Markov models (Yes at S370), the decision unit 380 calculates the score with respect to each classification result, and outputs the classification result that has gained the highest score (S380).

Hereunder, the specific example of the score and a calculation method thereof will be described.

The score is a value indicating the appropriateness of the classification result, and calculated on the basis of, for example, the plausibility of the classification result and the amount of the parameter of the hidden Markov model. Accordingly, the score becomes higher the more plausible the classification result is, and becomes lower the greater the amount of the parameter (for example, the number of states) is.

More specifically, the decision unit 380 calculates the score on the basis of a predetermined information criterion with respect to each classification result. Examples of the information criterion include a Bayesian information criterion (BIC), and Akaike information criterion (AIC). The decision unit 380 calculates the score, for example on the basis of the Bayesian information criterion, by the equation of "score=log likelihood−parameter dependent term". To be more accurate, the decision unit 380 employs the following Equation 11 to calculate the score.

[Math. 11]

$$\text{Score} = \log(l(x_1, \ldots, x_L)) - \frac{p}{2}\log(L) \quad \text{(Equation 11)}$$

In Equation 11, l(•) represents the likelihood, p represents the total number of the statistical parameter of the hidden Markov model, and L represents the number of pieces of the data x. The likelihood l(•) may be calculated on the basis of the following Equation 12.

[Math. 12]

$$l(x_1, \ldots, x_L) = \log P(x_1, \ldots, x_L) = \sum_{l=1}^{L} \log P(x_l) \quad \text{(Equation 12)}$$

For Equation 12, P(x) may be obtained through Equation 7. In addition, since the likelihood varies depending on the parameter of the hidden Markov model, the likelihood may be calculated with Equation 13.

[Math. 13]

$$l(x_1, \ldots, x_L | \theta) = \log P(x_1, \ldots, x_L | \theta) \quad \text{(Equation 13)}$$
$$= \sum_{l=1}^{L} (x_l | \theta)$$

In Equation 13, θ represents the current parameter of the hidden Markov model. More specifically, θ represents the state transition probability matrix A and the parameter $\theta_k$ of k pieces of probability distribution.

As described above, the classification device 300 according to the embodiment 2 classifies the plurality of pieces of location information with respect to each of the plurality of left-to-right hidden Markov models each having a different number of states, and determines the optimum classification result. More specifically, the classification device 300 calculates the score with respect to each classification result, and determines the classification result that has gained the highest score as the optimum classification result. Accordingly, since the optimum classification result is selected out of the plurality of classification results, which further assures that the user can obtain the desired classification result.

In the case where the Markov model output unit 340 calculates the parameter and classifies the location information with respect to two hidden Markov models, the Markov model output unit 340 may determine the classification result that has gained the higher score between the two classification results as the optimum classification result. More specifically, the Markov model output unit 340 first determines the parameter corresponding to each of a first and a second hidden Markov model, out of the plurality of hidden Markov models stored in the hidden Markov model storage unit 330. Then the Markov model output unit 340 outputs the first defined hidden Markov model and the second defined hidden Markov model each containing the determined parameter.

The classification unit 350 generates a first classification result on the basis of the first defined hidden Markov model and the plurality of pieces of location information, as well as a second classification result on the basis of the second defined hidden Markov model and the plurality of pieces of location information. The decision unit 380 then calculates a first score indicating the appropriateness of the first classification result and a second score indicating the appropriateness of the second classification result, and determines the classification result corresponding to the higher one of the first score and the second score, as the optimum classification result.

Further, although the classification device 300 according to the embodiment 2 of the present invention is configured so as to calculate the parameter and classify the location information with respect to each of the plurality of hidden Markov models and select the classification result that has gained the highest score, the classification device 300 may calculate the parameter and classify the location information sequentially from the hidden Markov model containing a fewer number of states.

Figure 11:
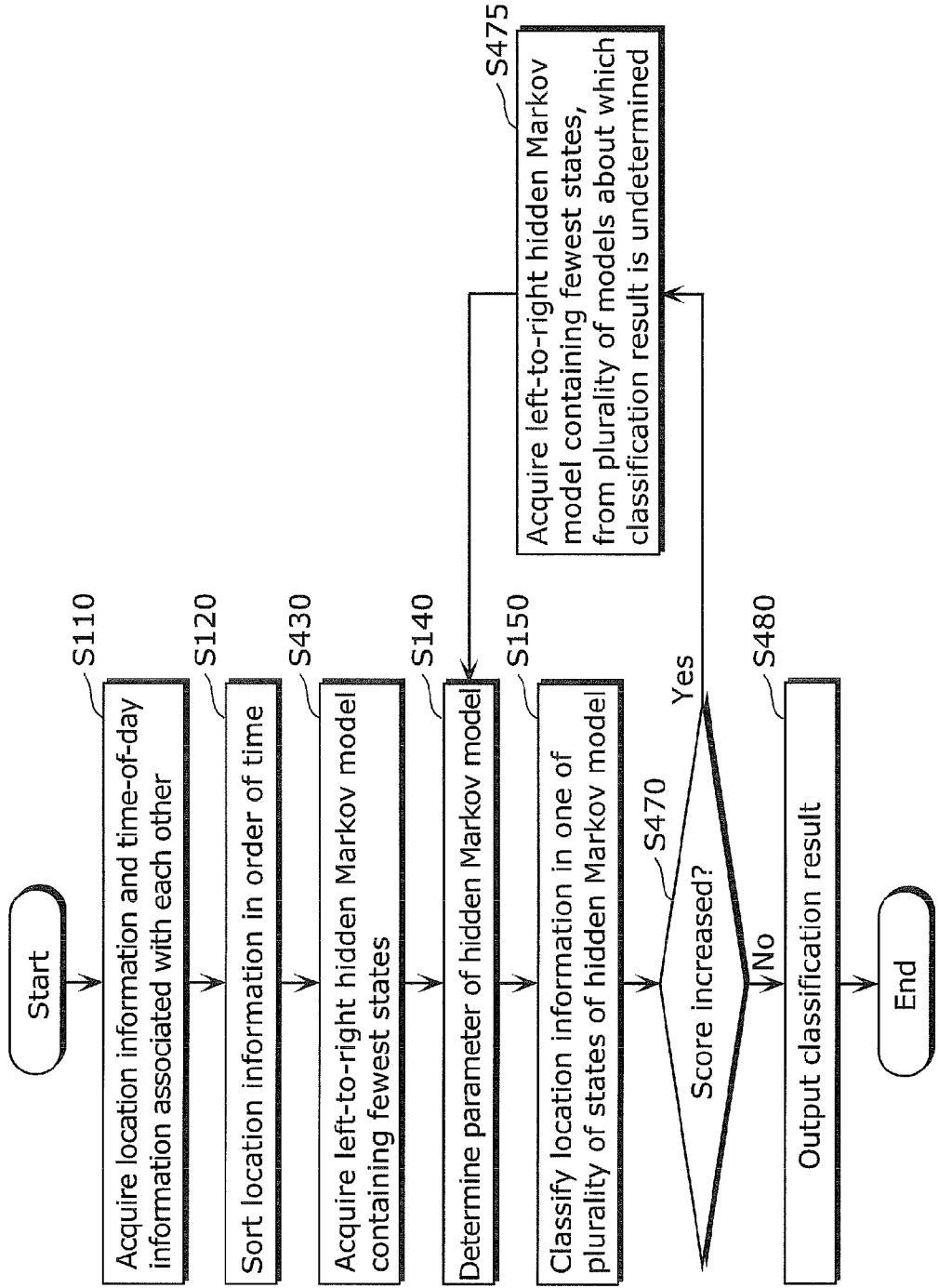
FIG. 11 is a flowchart showing another operation of the classification device according to the embodiment 2 of the present invention.

FIG. 11 is a flowchart showing an operation of the classification device 300 according to a variation of the embodiment 2 of the present invention.

First, the sorting unit 120 acquires the location information and the time-of-day information associated with each other from the data storage unit 110 (S110). Then the sorting unit 120 sorts the location information in order of time (S120).

The Markov model output unit 340 then acquires a first hidden Markov model containing the fewest number of states among the plurality of hidden Markov models stored in the hidden Markov model storage unit 330 (S430). Then the Markov model output unit 340 determines the parameter of the first hidden Markov model acquired as above (S140), and outputs the first defined hidden Markov model containing the determined parameter.

The classification unit 350 classifies each of the location information into one of the plurality of states contained in the first defined hidden Markov model, to thereby generate the first classification result (S150).

The decision unit 380 calculates the first score indicating the appropriateness of the first classification result. The first score may be calculated in the same method as above. At this stage the decision unit 380 is to compare the score (S470), however since other scores have not been obtained yet (Yes at S470), the decision unit 380 causes the Markov model output unit 340 to determine the parameter of a next hidden Markov model.

More specifically, the Markov model output unit 340 acquires, from the hidden Markov model storage unit 330, the hidden Markov model containing the fewest number of states among the plurality of hidden Markov models about which the classification result has not yet been obtained (S475). In this example, the Markov model output unit 340 acquires a second hidden Markov model containing the second fewest number of states among the hidden Markov models stored in the hidden Markov model storage unit 330.

Then the Markov model output unit 340 determines the parameter of the second hidden Markov model thus acquired (S140), and outputs the second hidden Markov model containing the determined parameter.

The classification unit 350 then classifies each of the location information into one of the plurality of states contained in the second defined hidden Markov model, to thereby generate the second classification result (S150).

Then, the decision unit 380 calculates the second score indicating the appropriateness of the second classification result. The second score may be calculated in the same method as above. The decision unit 380 now compares the first score and the second score (S470).

In the case where the first score is higher than the second score (No at S470), the decision unit 380 determines the first classification result as the optimum classification result. Then the classification result output unit 390 outputs the first classification result (S480).

In the case where the first score is lower than the second score, i.e., the score has increased (Yes at S470), the decision unit 380 causes the Markov model output unit 340 to determine the parameter of the hidden Markov model containing the third fewest number of states. Accordingly, the Markov model output unit 340 acquires the hidden Markov model containing the third fewest number of states from the hidden Markov model storage unit 330 (S475).

Thereafter, the decision unit 380 causes the Markov model output unit 340 to likewise repeat the calculation of the parameter until the M-th score (M is an integer not fewer than 2) corresponding to the hidden Markov model containing the M-th fewest number of states turns out to be equal to or lower than the (M−1)th score corresponding to the hidden Markov model containing the (M−1)th fewest number of states. Thus, the decision unit 380 compares the M-th score and the (M−1)

th score, and determines the classification result corresponding to the hidden Markov model containing the (M−1)th fewest number of states as the optimum classification result, when the M-th score turns out to be equal to or lower than the (M−1)th score.

As described above, the classification device 300 according to the embodiment 2 of the present invention calculates the parameter and classifies the location information sequentially from the hidden Markov model containing the fewer number of states.

Generally, the greater the number of states is, the higher the to likelihood becomes, to be converged to a predetermined value. Meanwhile, the greater the number of states is, the greater number of parameters is involved. Since the score is obtained by subtracting the number of parameters from the likelihood, the score becomes higher as the number of states increases and becomes lower after passing a predetermined maximal value. Accordingly, sequentially processing the hidden Markov models from the one containing the fewest number of states allows the classification result of the highest score through fewer processing steps compared with the case where the processing is performed with respect to all the hidden Markov models.

Consequently, the classification device 300 according to the variation of the embodiment 2 enables the optimum classification result to be obtained through fewer processing steps.

Although the classification device and the classification method according to the present invention have been described referring to the embodiments, the present invention is in no way limited to the foregoing embodiments. Modifications that can be reached by those skilled in the art and made to the foregoing embodiments, as well as combinations of the constituents of different embodiments are included in the present invention, unless deviating from the scope and spirit of the present invention.

Figure 12:
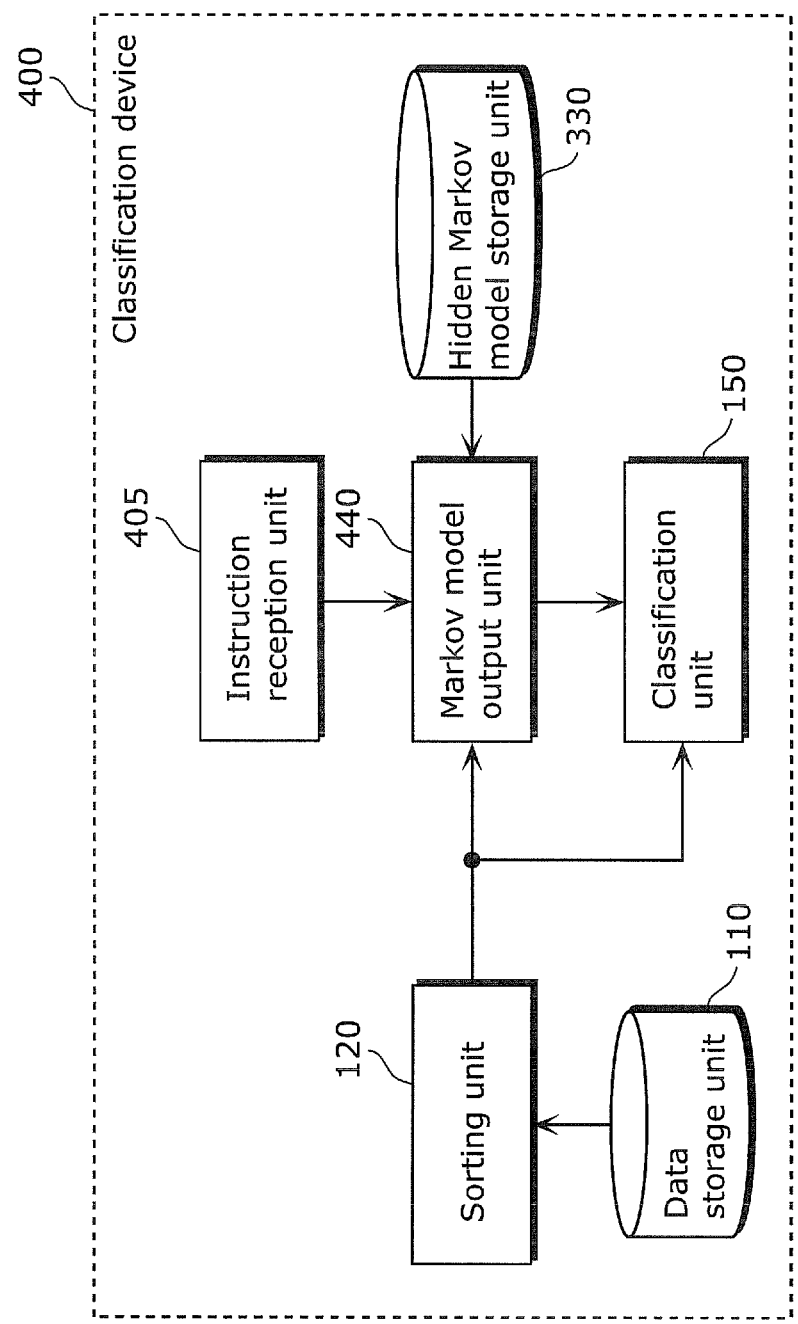
FIG. 12 is a block diagram showing a configuration of a classification device according to a variation of the embodiments of the present invention.

For example, the number of states of the hidden Markov model may be selected in accordance with an instruction of the user. FIG. 12 is a block diagram showing a configuration of a classification device 400 according to a variation of the embodiments of the present invention. In FIG. 12, the constituents that are the same as those of the embodiments 1 and 2 will be given the same numeral, and the description thereof will not be repeated.

The classification device 400 shown in FIG. 12 is different from the classification device 100 shown in FIG. 2 in including a hidden Markov model storage unit 330 and a Markov model output unit 440 in place of the hidden Markov model storage unit 130 and the Markov model output unit 140, respectively, and in further including an instruction reception unit 405.

The instruction reception unit 405, which is for example a user interface, receives the instruction of the user indicating the number of states of the hidden Markov model. Here, the number of states of the hidden Markov model corresponds to the number of groups in which the plurality of pieces of location information is to be classified. The instruction reception unit 405 may include a display unit that displays a graphical user interface (GUI) for receiving the instruction of the user by causing the user to input a value indicating into how many groups the user wishes to classify the location information.

The Markov model output unit 440 determines the parameter of the hidden Markov model containing the number of states selected by the instruction received by the instruction reception unit 405. More specifically, the Markov model output unit 440 first acquires the hidden Markov model containing the number of states selected by the instruction received by the instruction reception unit 405, from the hidden Markov model storage unit 330. Then the Markov model output unit 440 inputs the plurality of pieces of location information sorted in order of time into the hidden Markov model, to thereby calculate the parameter.

Such a configuration allows the user to designate the number of states, thereby further increasing the possibility that the user can obtain the desired classification result.

A predetermined label may be assigned to the probability distribution applicable to each of the plurality of states contained in the hidden Markov model, on the basis of the profile of the probability distribution. In this case, the classification unit may output the classification result with the label attached thereto with respect to each state.

Figure 13:
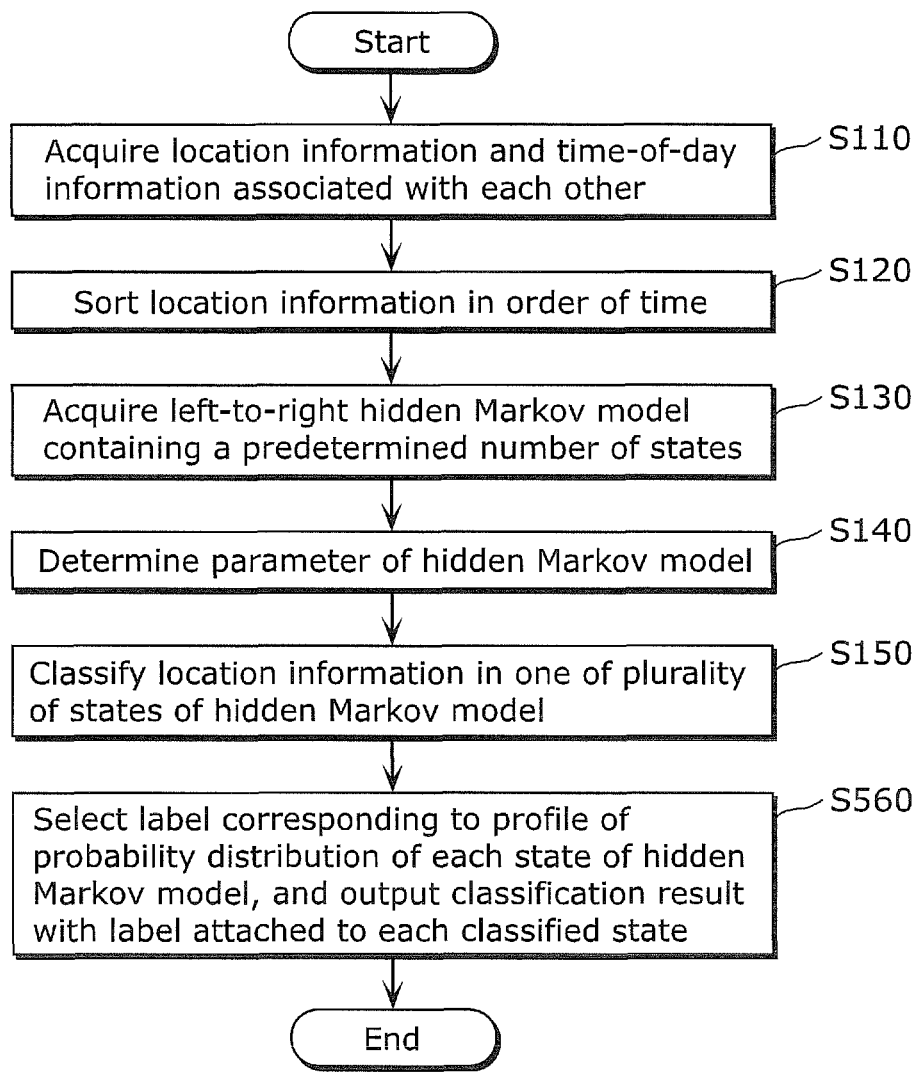
FIG. 13 is a flowchart showing an operation of the classification device according to the variation of the embodiments of the present invention.

FIG. 13 is a flowchart showing an operation of the classification device according to another variation of the embodiments of the present invention. Here, the operation up to the step of obtaining the classification result (S110 to S150) is the same as that shown in FIG. 4, and hence the description will not be repeated.

The classification unit 150 selects, upon obtaining the classification result, the label corresponding to the profile of the probability distribution corresponding to each of the plurality of states contained in the hidden Markov model, and outputs the classification result with the label attached to each classified state (S560). For example, the classification unit 150 may contain in advance a table showing the profiles of the probability distribution and corresponding predetermined labels respectively associated with each other.

FIG. 14 is a table showing an example of the association between probability distribution and the label according to another variation of the embodiments of the present invention. The profile of the probability distribution may be determined by, for example, at least one of the expectation p and the dispersion $\sigma^2$.

In the example shown in FIG. 14, in the case where the dispersion σ2 is small the label of "staying" is associated, and in the case where the dispersion σ2 is great the label of "moving" is associated. Thus, such expressions that define the feature of the dispersion of the plurality of pieces of location information, more particularly the feature of the subject's activities are employed for the labels.

The classification unit 150 thus outputs the label made up on the basis of the profile of the probability distribution, together with the classification result. Attaching the label facilitates the user to recognize which type of group the classified location information belongs to. Accordingly, when the classification of the contents corresponding to the location information is completed, the user can search for the desired content in a shorter time and thus the usability is improved, which contributes to reduction of power consumption by the classification device.

Although the optimum classification result is selected out of the plurality of classification results in the embodiment 2, the plurality of classification results may be presented to the user so that the user can select the optimum classification result.

The classification device according to the foregoing embodiments may typically be realized as an LSI which is a semiconductor integrated circuit (IC). The classification device realized as an IC may, for example, only include the sorting unit 120, Markov model output unit 140, and the classification unit 150 shown in FIG. 1, and the storage units may be excluded. These units may be individually realized as a single chip, or a part or whole of the units may be realized in a single chip. Although the term "LSI" is adopted in the foregoing passage, such terms as IC, system LSI, super LSI, or ultra LSI may be adopted depending on the level of integration.

In addition, the form of integration is not limited to the LSI, but an exclusive circuit or a general-purpose processor may be employed. Alternatively, a field programmable gate array (FPGA) that can be programmed after manufacturing the LSI, or a reconfigurable processor that allows reconfiguration of connection or setting of circuit cells in the LSI may be employed.

Further, when a new technique of integration that can be substituted for the LSI is developed with further progress of the semiconductor technology or a derivative technique, such new techniques may naturally be employed for the integration of the functional blocks. One of the possibilities is the application of the biotechnology.

Still further, a semiconductor chip in which the classification device according to the foregoing embodiments is integrated and a display unit that draws an image may be combined, so as to constitute drawing apparatuses applicable to various purposes. Accordingly, the present invention is applicable to information displaying apparatuses such as mobile phones, TV sets, digital video recorders, digital video cameras, car navigation systems, and so forth. Examples of the display, units that can be employed in combination include, in addition to brown tubes (CRT), flat displays such as a liquid crystal or plasma display panel (PDP) and an organic EL display, as well as a projection display typically exemplified by a projector.

INDUSTRIAL APPLICABILITY

The classification device according to the present invention can be advantageously applied to battery-driven mobile display terminals such as mobile phones, mobile music players, digital cameras, digital video cameras, and so forth; menu display on high-definition information display apparatuses such as TV sets, digital video recorders, car navigation systems, and so forth; and information display on Web browsers, editors, EPG, map displays, and so forth.

REFERENCE SIGNS LIST 100, 200, 300, 400 Classification device
110 Data storage unit
120 Sorting unit
130, 330 Hidden Markov model storage unit
140, 340, 440 Markov model output unit
150, 350 Classification unit
260 Content storage unit
270 Content output unit
380 Decision unit
390 Classification result output unit
405 Instruction reception unit

The invention claimed is:

1. A classification device comprising:
    a data storage unit configured to store a plurality of pieces of time-of-day information each indicating a different time of day, and a plurality of pieces of location information respectively associated with one of the plurality of pieces of time-of-day information and indicating a location where a subject was at an associated time of day;
    a sorting unit configured to sort the plurality of pieces of location information in order of time by using the plurality of pieces of time-of-day information;
    a hidden Markov model storage unit storing therein a left-to-right hidden Markov model that contains a plurality of states and in which a parameter is undetermined;
    a Markov model output unit configured to determine the parameter by inputting the plurality of pieces of location information sorted in order of time by said sorting unit into the hidden Markov model, and output a defined hidden Markov model containing the determined parameter; and
    a classification unit configured to classify each of the plurality of pieces of location information into one of the plurality of states in order of time, by inputting the plurality of pieces of location information sorted in order of time by said sorting unit into the defined hidden Markov model.

2. The classification device according to claim 1, further comprising:
    a content storage unit configured to store a plurality of contents respectively corresponding to one of the plurality of pieces of location information; and
    a content output unit configured to read out from said content storage unit, with respect to each of the plurality of states, the content corresponding to the location information classified into the corresponding state, and output the content.

3. The classification device according to claim 1,
    wherein said hidden Markov model storage unit stores therein a plurality of left-to-right hidden Markov models each containing a different number of states and in each of which a parameter is undetermined,
    said Markov model output unit is configured to determine the parameter of each of N (N is an integer not fewer than 2) hidden Markov models out of the plurality of hidden Markov models stored in said hidden Markov model storage unit, and output N defined hidden Markov models each containing the determined parameter, and
    said classification unit is configured to classify each of the plurality of pieces of location information into one of the plurality of states contained in the corresponding defined hidden Markov model, with respect to each of the N defined hidden Markov models,
    said classification device further comprising:
    a decision unit configured to calculate a score indicating appropriateness of a classification result generated by said classification unit with respect to each of the defined hidden Markov models, and determine, as an optimum classification result, a classification result the calculated score of which satisfies a predetermined condition; and
    a classification result output unit configured to output the classification result determined by said decision unit.

4. The classification device according to claim 3,
    wherein said decision unit is configured to determine, as the optimum classification result, the classification result that has gained the highest score among the N classification results.

5. The classification device according to claim 3,
    wherein said Markov model output unit is configured to determine the parameter corresponding to a first hidden Markov model and a second hidden Markov model out of the plurality of hidden Markov models stored in said hidden Markov model storage unit, and output a first defined hidden Markov model and a second defined hidden Markov model each containing the determined parameter,
    said classification unit is configured to classify each of the plurality of pieces of location information into one of the plurality of states contained in the first defined hidden Markov model to thereby generate a first classification result, and classify each of the plurality of pieces of location information into one of the plurality of states contained in the second defined hidden Markov model to thereby generate a second classification result, and said decision unit is configured to calculate a first score indicating appropriateness of the first classification result and a second score indicating appropriateness of the second classification result, and determine the classification result corresponding to the higher one of the first score and the second score as the optimum classification result.

6. The classification device according to claim 5, wherein the first hidden Markov model is a hidden Markov model containing a fewest number of states, the second hidden Markov model is a hidden Markov model containing a second fewest number of states, and said decision unit is configured to determine the first classification result as the optimum classification result in the case where the first score is equal to or higher than the second score, and cause said Markov model output unit to determine the parameter of a third hidden Markov model containing a third fewest number of states in the case where the first score is lower than the second score.

7. The classification device according to claim 6, wherein said decision unit is configured to cause said Markov model output unit to repeat the determination of the parameter until a score corresponding to a hidden Markov model containing an M-th fewest number of states (M is an integer not fewer than 2) becomes equal to or lower than a score corresponding to a hidden Markov model containing an (M−1)th fewest number of states.

8. The classification device according to claim 1, further comprising an instruction reception unit configured to receive an instruction of a user indicating the number of states of the hidden Markov model, wherein said hidden Markov model storage unit stores therein a plurality of left-to-right hidden Markov models each containing a different number of states and in which a parameter is undetermined, and said Markov model output unit is configured to determine the parameter of the hidden Markov model containing the number of states indicated by the instruction received by said instruction reception unit.

9. The classification device according to claim 1, wherein the parameter contains a symbol occurrence probability indicating a corresponding probability distribution with respect to each state, the probability distribution is assigned with a predetermined label formed on the basis of a profile of the probability distribution, and said classification unit is further configured to attach the label to each state and output the classification result with the label.

10. A classification method comprising:

acquiring, from a data storage unit, a plurality of pieces of time-of-day information each indicating a different time of day, and a plurality of pieces of location information respectively associated with one of the plurality of pieces of time-of-day information and indicating a location where a subject was at an associated time of day;

sorting the plurality of pieces of location information in order of time by using the plurality of pieces of time-of-day information;

acquiring a left-to-right hidden Markov model containing a plurality of states and in which a parameter is undetermined, from a hidden Markov model storage unit;

determining the parameter by inputting the plurality of pieces of location information sorted in order of time in said sorting of the location information, into the hidden Markov model, and outputting a defined hidden Markov model containing the determined parameter; and classifying each of the plurality of pieces of location information into one of the plurality of states in order of time, by inputting the plurality of pieces of location information sorted in order of time in said sorting of the location information, into the defined hidden Markov model.

11. A non-transitory computer-readable recording medium for use in a computer, said recording medium having a computer program recorded thereon for causing a computer to execute the classification method according to claim 10.

12. An integrated circuit that classifies a plurality of pieces of location information indicating a location of a subject and respectively associated with one of a plurality of pieces of time-of-day information each indicating a different time of day, said integrated circuit comprising:

a sorting unit configured to sort the plurality of pieces of location information in order of time by using the plurality of pieces of time-of-day information;

a Markov model output unit configured to determine the parameter by inputting the plurality of pieces of location information sorted in order of time by said sorting unit into a left-to-right hidden Markov model containing a plurality of states and in which a parameter is undetermined, and output a defined hidden Markov model containing the determined parameter; and a classification unit configured to classify each of the plurality of pieces of location information into one of the plurality of states in order of time, by inputting the plurality of pieces of location information sorted in order of time by said sorting unit into the defined hidden Markov model.

* * * * *